(12) United States Patent
Ito

(10) Patent No.: US 6,253,152 B1
(45) Date of Patent: Jun. 26, 2001

(54) NAVIGATION CONTROLLER

(75) Inventor: Toru Ito, Nagoya (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 09/144,261

(22) Filed: Aug. 31, 1998

(30) Foreign Application Priority Data

Sep. 2, 1997 (JP) .................................................... 9-237008

(51) Int. Cl.[7] .......................................................... G01G 7/78
(52) U.S. Cl. ......................... 701/209; 701/200; 701/211; 73/178 R
(58) Field of Search ................................... 701/209, 211, 701/200, 23, 25; 340/988, 990, 995; 73/178 R

(56) References Cited

U.S. PATENT DOCUMENTS 5,754,430 * 5/1998 Sawada ................................ 701/209

OTHER PUBLICATIONS

"Full of Technologies (Technology Ga Ippai)", (Monthly ASCII, ASCII Inc. (Japanese publication), vol. 21, May 1997, pp. 354–359.

* cited by examiner

Primary Examiner—William A. Cuchlinski, Jr.
Assistant Examiner—Yonel Beaulieu
(74) Attorney, Agent, or Firm—Finnegan, Henderson, Farabow, Garrett & Dunner, L.L.P.

(57) ABSTRACT

A navigation controller includes, in addition to a main CPU in the form of a general purpose CPU, a media processor having a VLIW structure or an SIMD structure. The main CPU controls ordinary navigation actions and causes the media processor to perform a route calculation requiring product-sum operations. The high-speed calculation ability of the media processor is utilized, remarkably increasing the route calculation speed. Preferably, the media processor executes both route calculation processing and graphics processing by time sharing. The time sharing ratio is varied in accordance with the state of navigating action so that the calculation time can be reduced to a minimum while an appropriate image display is maintained.

7 Claims, 4 Drawing Sheets

NAVIGATION CONTROLLER

BACKGROUND OF THE INVENTION

1. Field of the Invention

The present invention relates generally to a navigation controller provided in a navigation apparatus for performing route guidance, and more particularly to a controller capable of swifter calculation processing route for use in route guidance.

2. Description of the Related Art

Navigation apparatuses using map data for route guidance are well known. As its basic function, such a navigation apparatus has a route calculation function. During route calculation, map data is used to find a proper route from a starting point up to a destination. One common route calculation technique is the Dijkstra algorithm in which a calculation condition such as the shortest distance or the shortest time is designated and a route satisfying the calculation condition. The thus calculated route is then used for route guidance. While a variety of route guiding methods are proposed, typically, a map around a current position appears on a display, with the current position indicated on the map. In addition, a set route is indicated on the map in a way to distinguish it from other roads. Output in the form of voice guidance from a speaker is also used.

In recent years, navigation apparatuses for motor vehicles have particularly rapidly become common. A navigation apparatus for a motor vehicle is an indispensable supporting technique for ITS (intelligent transport system) intended to develop the transportation system through the provision of various useful information to the vehicles.

Such a navigation commonly apparatus commonly includes a variety of constituent elements such as a sensor for detecting a current position, a map data base, a display and a speaker serving as output devices, and input devices including switches, an FM multiplex or VICS receiver, and so forth. In order to control these elements, a controller comprising a microcomputer unit is commonly provided. The controller provides control signals as its output to the various elements to be controlled. The controller internally performs route calculation, various other calculation processing necessary for route guidance.

FIG. 1 illustrates a configuration of a controller 100 provided in a typical conventional navigation apparatus. The controller 100 has a general purpose CPU 102 and a program memory 104. The initial general purpose CPU 102 was commonly of a 16-bit type, but currently a 32-bit RISC processor is often used. The general purpose CPU 102 controls the navigation apparatus through the execution of the navigation program stored in the program memory 104.

The navigation program stored in the program memory 104 consists of a plurality of program modules. A basic control program controls all general actions of the navigation apparatus. The execution of this program allows almost all navigation actions, including input and setting of the destination, to be controlled. In addition to the basic control program, other programs are stored in which processing requiring special operations is modularized. A route calculation processing program decides on a route between a starting point and a destination. A graphics processing program draws an image on the display. A voice expansion program expands compressed voice data stored in a storage medium. Hereinafter, programs other than the basic control program, such as the graphics processing program or the voice expansion program will be collectively referred to as "accompanying programs".

For the conventional controller 100, the single general purpose CPU 102 exclusively manages and executes all processing of the navigation program. The general purpose CPU 102 is highly versatile in dealing with various processing and is advantageously able to perform various navigation processing. In contrast with this, it is disadvantageous in that it takes significant amount of time to perform processing such as route calculation because route calculation requires product-sum operations of the data in the map data base to find an optimum route, while the general-purpose CPU 102 is not adept at such processing.

In fact, although the required route calculation time naturally varies for each navigation apparatus, most apparatuses now require several tens of seconds. Reducing the wait time up to the completion of the route calculation is greatly desired in order to enhance the market value of such devices. Taking into consideration the time taken to read map data from the record medium, it is ideally desirable to reduce the calculation time to about one second. However, such high-speed route calculation has not been realized by any known art.

Also, in a conventional navigation apparatus, small streets in residential areas and the like are not considered as route candidates. It is, however, desired that navigation apparatuses be able to plan a route including such streets in order to improve their function and to improve total traffic efficiency and safety. In particular, it is preferable to consider small streets in the vicinity of the destination and the starting point. However, consideration of such streets results in a large increase in data throughput, which necessitates an even higher calculation ability.

Acquiring a measurement value such as a travel time (trip time) required for traveling a certain segment of a road from a radio communication infrastructure (VICS (vehicle information system) or an FM multiplex broadcasting) is also known. The trip time is used to figure out a route ensuring an arrival to the destination in the shortest time. Future trends are toward the reduction in intervals of the provision of information from the radio communication infrastructure to provide more accurate information. In order to take advantage of the sequentially sent abundant information, it is desired that the navigation apparatus immediately issue the result of route calculation, which necessitates still faster route calculation processing.

Therefore, although a conventional apparatus already requires excessive time for the route calculation processing, the data throughput is steadily increasing as a result of diversity of route calculation processing. It is therefore an important problem for the navigation apparatus to realize high-speed route calculation processing.

Nevertheless, as described with reference to FIG. 1, the general-purpose CPU hitherto exclusively manages all navigation processing as well as route calculation. As long as such a configuration is employed, it will remain difficult to achieve a high-speed route calculation. Conventional general measures include increasing the clock frequency of the CPU, increasing the speed of the CPU itself by means of a superscalar, and increasing the access speed of the D-RAM. These measures are, however, restricted, and a marked improvement in the calculation speed can not be expected through improvements in such art.

SUMMARY OF THE INVENTION

It is therefore the object of the present invention to provide a navigation controller capable of quickly performing route calculation and capable of achieving an improvement in the commercial value of the navigation apparatus.

(1) In order to achieve the above object, the navigation controller of the present invention is a unit intended to control a navigation apparatus which performs a route guidance using a route set by a route calculation. The controller comprises a main CPU for executing a basic control program for controlling the action of the navigation apparatus and an action state judgment program for judging the state of action of the navigation apparatus. A media processor connected to the main CPU and including a plurality of simultaneously functioning ALUs to execute a route calculation processing program for setting a route. In response to a result of judgment of the state of action, the main CPU controls the media processor to make a route calculation and performs a route guidance using a thus calculated route.

The media processor is a processor for allowing a plurality of built-in ALUs (Arithmetic Logical Units) to function at the same time. The media processor itself is well known, as will be described later, and has example applications in personal computers. The media processor is of a VLIW structure and/or an SIMD structure. In VLIW (Very Long Instruction Word), a single instruction code includes a plurality of instructions, and a plurality of processes for one set of data are simultaneously performed. In SIMD (Single Instruction Multi Data), one instruction process is performed simultaneously for a plurality of data sets. A media processor may also have both VLIW and SIMD structures. The media processor may be a DSP (Digital Signal Processor) having a plurality of ALUs. A general performs a single calculation at a time in correspondence to one instruction and one data. On the other hand, the media processor is suitable for a relatively simple instruction and is capable of simultaneously performing a plurality of arithmetic operations. Therefore, the media processor is adapted for quantities of product-sum operations or repeated operations and is able to perform such calculation processing at a high speed.

In one aspect of the present invention, the main CPU executes a basic control program. The basic control program controls the general action of the navigation apparatus. In such processing, a high calculation speed is of less importance, though it is preferable to use a CPU capable of various processing, for which the general-purpose CPU is suitable. The route calculation processing is, however, performed by the media processor. The route calculation processing often includes processing in which product-sum operations are performed in the process of searching an optimum route using the map data. Thus, media processing is appropriate for the route calculation processing.

According to the present invention, the main CPU executes the basic control program as well as the action state judgment program to judge the state of action of the navigation apparatus. Then, when a state of action requiring the route calculation, such as upon the start or upon the deviation from the route is detected, the main CPU causes the media processor to perform a route calculation. Furthermore, through the execution of the basic control program, the main CPU performs the route guidance by using the result of the route calculation. In this manner, the media processor is provided in addition to the main CPU, with both processors cooperating under the control of the main CPU, thereby allowing the processors to perform their respective processing. In this manner, route calculation speed is remarkably increased, which immediately enhances the commercial value of the navigation apparatus, and enables it to cope with future higher levels of route calculations.

(2) In a navigation controller according to one aspect of the present invention, the media processor executes, in addition to the route calculation processing program, predetermined accompanying programs except the basic control program. The main CPU sends to the media processor a time sharing control signal for executing in time sharing and in parallel the route calculation processing program and the predetermined accompanying programs.

The predetermined accompanying program is preferably a graphics processing program. The graphics processing often includes product-sum operations of a volume of data or repeated operations. Accordingly, the graphics processing is processing of a type suitable for the execution by the media processor and utilization of the media processor enables high-speed processing to be realized. Similarly, the predetermined accompanying program may be a voice expansion program.

In this aspect, the media processor executes not only the route calculation processing program, but also a specific accompanying program suitable for the media processor. The controller has a less opportunity to perform the route calculation but rather typically has a longer time during which it does not handle the route calculation. In this aspect, the media processor is in service even for the duration where the route calculation is not performed. The route calculation must be performed while continuing other processing such as the graphics processing. In this aspect, by time sharing processing of the route calculation program and the accompanying program, it is possible to execute the two processes in parallel. In this way, the media processor can effectively be utilized in a preferred form.

(3) Preferably, on the basis of a result of judgment of the state of action, the main CPU determines the allocation of time sharing control to the route calculation processing program and to the predetermined accompanying programs, the main CPU sending a control signal including the thus determined allocation to the media processor.

For example, if the accompanying program is a graphics processing program, the main CPU judges the state of action of the navigation apparatus and, if necessary, allows an interruption of the route calculation into the graphics processing. The state of action of the navigation includes a state in which the route calculation has a priority and a state in which the route calculation has no priority. For example, upon the initial route calculation at the starting point, the wait time for the route calculation is problematic whereas the graphics processing is comparatively simple. On the other hand, for further route calculation beyond the initial route calculation, e.g., the route calculation due to deviation from the initial route, the graphics processing often presents a larger burden due to the scrolling or rotation of the map display performed while traveling which tends to increase the data throughput. In such a state, a reduction of the calculation power for the graphics processing may possibly induce incongruity of the image display. To address this point, in the controller according to this aspect of the present invention, the main CPU determines the allocation of the time sharing control to the route calculation processing and to the graphics processing on the basis of the result of judgment of the state of action. It is thus possible to perform high speed route calculation suitable to the state of action while still maintaining a desired image display.

DESCRIPTION OF THE PREFERRED EMBODIMENT

A preferred embodiment of the present invention will now be described with reference to the accompanying drawings. In this embodiment, the present invention is applied to a vehicle navigation apparatus intended to be installed on a motor vehicle.

Figure 1:
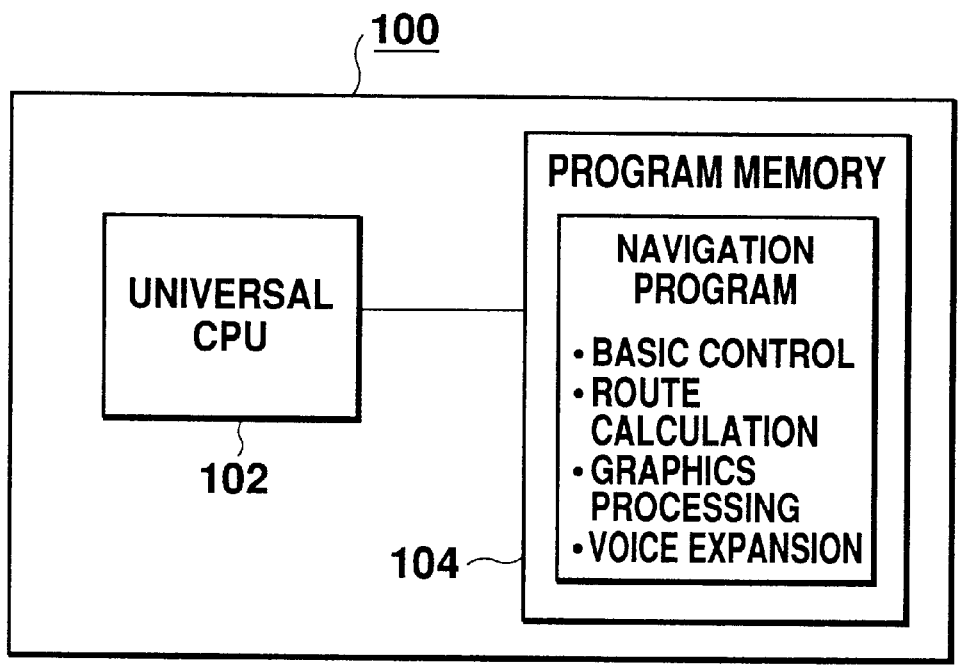
FIG. 1 is a block diagram showing a configuration of a conventional navigation controller.
Figure 2:
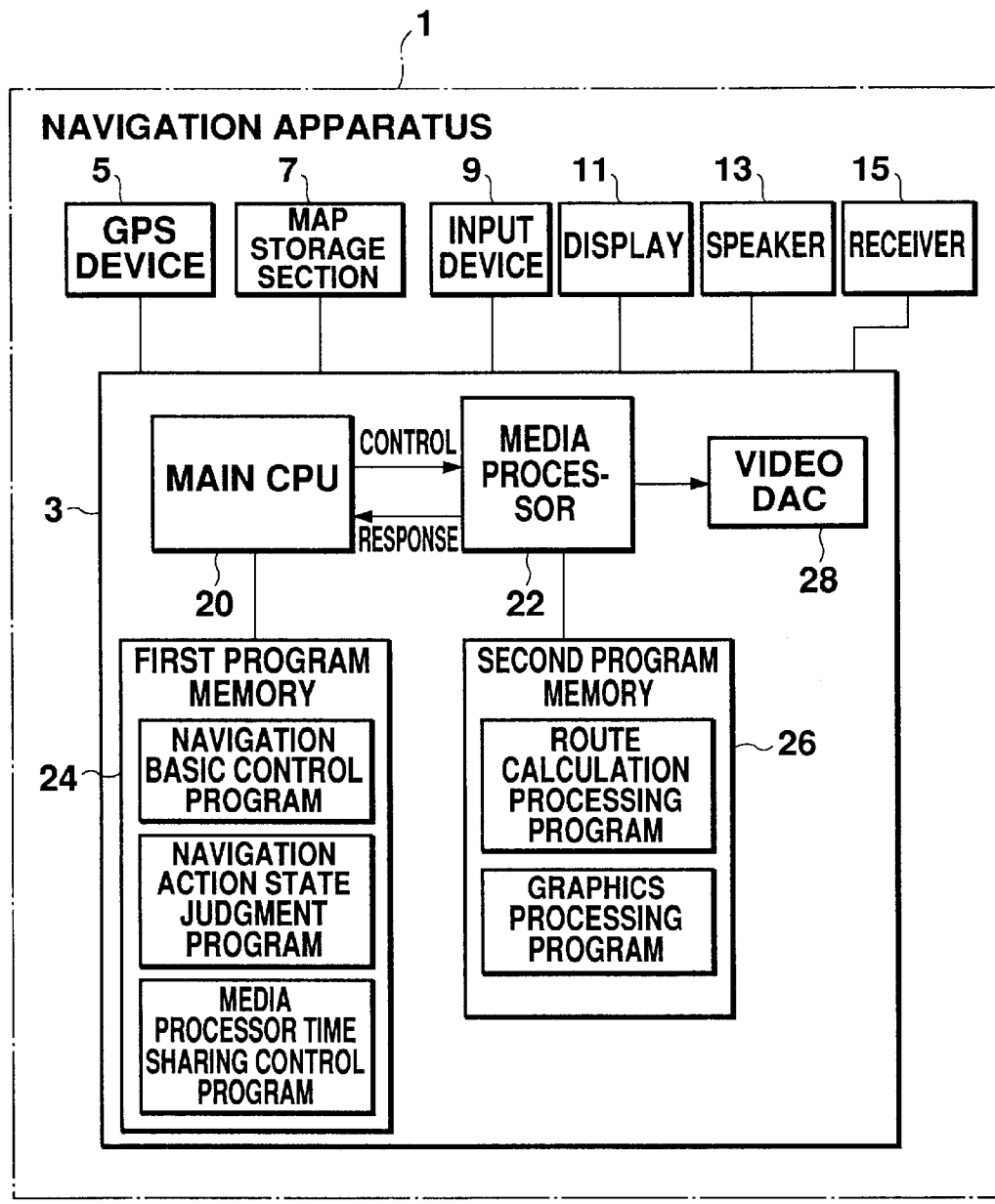
FIG. 2 is a block diagram showing an overall configuration of an embodiment of the present invention.

FIG. 2 is a block diagram showing an entire configuration of a navigation apparatus 1. The navigation apparatus 1 comprises a navigation controller 3 which controls the entire apparatus. To the navigation controller 3 are connected a GPS device 5, a map storage section 7, an input device 9, a display 11, a speaker 13 and a receiver 15. The navigation controller 3 is a so-called ECU (Electric Control Unit) and provides control of the above elements.

The GPS (Global Positioning System) device 5 detects a current position of a motor vehicle by utilizing signals transmitted from an artificial satellite and sends position information to the navigation controller 3. It is to be understood that this device may, of course, use a position detecting device other than GPS. Various current position detecting devices for use in satellite navigation, self-contained navigation, and radio navigation are available.

The map storage section 7 stores therein map data including nationwide road information. The map data includes display data used when a map display is effected on the display 11. The map data further includes route calculation data for searching and setting an optimum route between a starting point and a destination. The navigation controller 3 sets as the starting point a current position detected by the GPS device 5. Then, using the map data the navigation controller 3 calculates a route from the starting point up to the destination set by the user.

The input device 9 is a device through which the user enters various instructions into the navigation apparatus 1 and may include various switches and joysticks. The input device 9 may also include a voice recognition unit that recognizes the user's audible commands.

The display 11 and the speaker 13 are output devices for route guidance. The display 11 displays various images for route guidance under the control of the navigation controller 3. In a typical example, a map representing the vicinity of the current position will be displayed in such a way as to distinguish a guidance route from other roads with a current position mark displayed thereon. The map is scrolled in an appropriate manner as the motor vehicle advances, or is rotated in response to changes in the motor vehicle's direction. The speaker 13 provides as its output a voice guidance sent from the navigation controller 3.

As is well known, the display 11 may display an image associated with an user input operation. For example, a menu which can be selected by the user to set a destination may be displayed. Voice guidance corresponding to this input operation image is appropriately issued from the speaker 13. Such processing is also performed under the control of the navigation controller 3.

The receiver 15 receives a VICS signal from FM multiplex broadcasting or road side beacons. The received signal is transmitted to the navigation controller 3 and is utilized for the route guidance or route calculation. The received signal includes position detection correction data for D-GPS (Differential Global Positioning System).

The internal configuration of the navigation controller 3 will next be described. As shown in FIG. 2, the navigation controller 3 has two different operation processors, that is, a main CPU 20 and a media processor 22.

The main CPU 20 has the same configuration as that of the general purpose CPU provided in the conventional navigation apparatus. Thus, the main CPU 20 is able to perform various processing related to actions of the entire navigation apparatus 1.

On the other hand, as described above, the media processor 22 is a processor having a VLIW structure and/or an SIMD structure, or alternatively may be a DSP with a plurality of ALUs. Unlike the general purpose CPU as the main CPU 20, the media processor 22 is capable of simultaneously executing a plurality of arithmetic operations by use of the plurality of ALUs and is therefore suitable for the processing requiring a volume of product-sum operations.

In this embodiment, as will be described below, the main CPU 20 and the media processor 22 respectively perform their suitable program processing, with both processors cooperating to implement the route guidance function of the navigation apparatus 1. To the main CPU 20 is connected a first program memory 24 which stores programs executed by the main CPU 20 and to the media processor 22 is connected a second program memory 26 which stores programs executed by the media processor 22.

In the first program memory 24 is stored a navigation basic control program. The basic control program is a program for the control of almost all general actions of the navigation apparatus. More specifically, in this embodiment, all navigation functions except functions implemented by a route calculation processing program and a graphics processing program are implemented through the execution of the basic control program. This includes destination input and setting processing, processing for setting various conditions for a route search, and processing for providing actual route guidance by use of a calculated route. As described above, the main CPU 20 is suited to performing such processing.

On the other hand, in the second program memory 26 is stored the route calculation processing program. The route calculation processing selects a proper route using map data stored in the map storage section 7, and is executed in accordance with a technique such as Dijkstra's algorithm. The route calculation processing requires a number of product-sum operations and is therefore suited to the media processor, which realizes a processing speed 10 to 30 times higher than that of a common general purpose CPU having the same clock frequency. It therefore becomes possible to complete the route calculation which has hitherto required several tens of seconds in less than one or two seconds.

In the second program memory 26 is stored the graphics processing program as well as the route calculation processing program. The need to perform route calculation is limited in that most of the time the navigation apparatus is used, no route calculation is required. Accordingly, provision of a media processor dedicated only to the execution of the route calculation processing is disadvantageous from the viewpoint of hardware use efficiency, and results in a heavy cost burden. Thus, in this embodiment, the media processor 22 is caused to execute the graphics processing program as well so that the media processor 22 can be effectively used to realize an advantageous configuration in terms of cost.

Graphics processing is processing in which an image appearing on the display 11 is drawn by using map data for drawing stored in the map storage section 7. The created image is sent to the display 11 by way of a VIDEO-DAC (DA converter) 28. The graphics processing also requires high speed product-sum operations of quantities of data. Use of the media processor enables the graphics processing to be performed at a higher speed, thereby making it possible to improve the image appearing on the display 11.

Usually, the graphics processing requires successive execution for the duration in which the navigation apparatus is in service (in particular, during the route guidance). Hence, in this embodiment, the media processor 22 is made to continually perform the graphics processing. When there arises a need for the route calculation, the graphics processing is interrupted and the route calculation is performed. As will be described below, the media processor 22 performs parallel processing of the two programs under the control of the main CPU 20.

With respect to graphics processing, there are thoughts of achieving high-speed graphics processing by providing dedicated hardware. As compared with such a configuration, this embodiment is advantageous in that the media processor is used to perform both the route calculation and the graphics processing, so that the speed of two separate processes can be increased using low cost hardware.

The main CPU 20 and the first program memory 24 will be described in more detail. In the first program memory 24 is also stored a navigation action state judgment program and a media processor time sharing time dividing control program.

The media processor time sharing control program controls the media processor 22. The main CPU 20 runs this program, sends a control signal to the media processor 22, and receives a response signal from the media processor 22. Usually, the main CPU 20 causes the media processor 22 to exclusively execute graphics processing. When there arises a need for route calculation, the main CPU 20 instructs the media processor 22 to execute the route calculation processing. At that time, requisite information such as a starting point and a destination is also provided. The main CPU 20 receives the result of calculation from the media processor 22. Then, using the calculated route, the main CPU 20 performs route guidance in accordance with the basic control program.

In particular, in this embodiment, the media processor 22 operates in parallel the route calculation and the graphics processing by time sharing (time division). The main CPU 20 determines a time sharing ratio (what percentage of time is to be used for which processing) and sends the result to the media processor 22. The main CPU 20 alters the time sharing ratio in response to the state of action of the navigation apparatus 1.

The navigation apparatus 1 acts in accordance with the basic control program to be in diverse states of action. Through the execution of the action state judgment program, the main CPU 20 judges the states of action at each point of time. In particular, in this embodiment, there is a need to judge whether or not the state of action requires route calculation, and this judgment is made in accordance with the action state judgment program. The result of judgment of the action state is used for the execution of the above media processor time sharing control program. It is to be appreciated that the action state judgment program may be incorporated into the basic control program.

Figure 3:
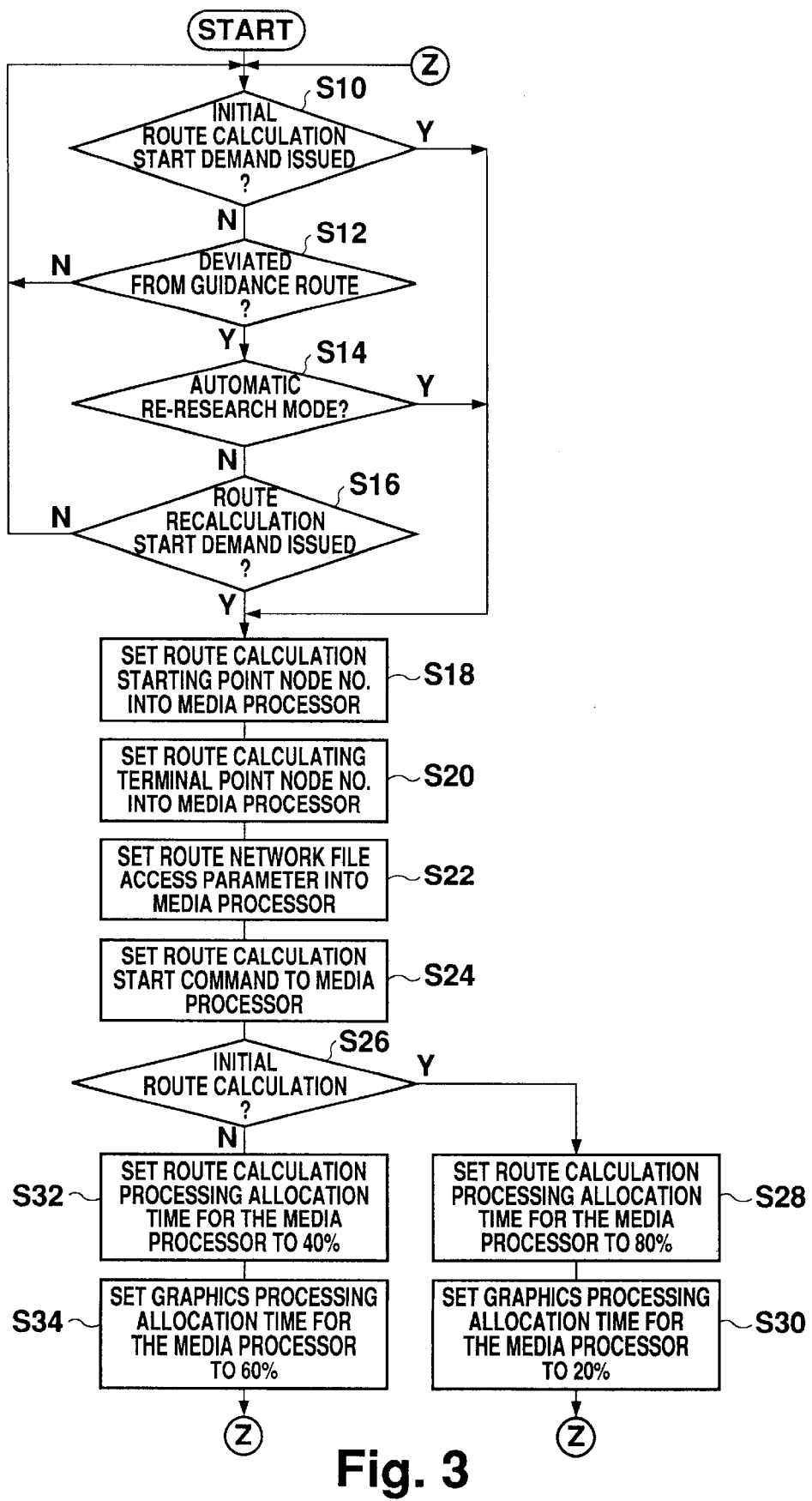
FIG. 3 is a flowchart showing processing for the control of a media processor by a main CPU of FIG. 1.

FIG. 3 will now be used to describe the action through which the main CPU 20 controls the media processor 22. As described above, the main CPU 20 causes the media processor 22 to continually perform the graphics processing.

In FIG. 3, steps S10 to S16 are processing related to the action state judgment program. In these steps, it is judged whether or not there is a need to perform route calculation. First, it is judged whether a demand to start the initial route calculation has arisen or not (S10). When the user enters a destination using the input device 9 as before the start of running, S10 is YES. Since the route calculation is required, the main CPU 20 proceeds to S18.

If S10 is NO, it is next judged whether or not the vehicle has deviated from the guidance route (S12). The guidance route is a route currently being used and has already been selected by the route calculation. Deviation from the guidance route is judged on the basis of a current position detected by the GPS device 5. If no deviation from the guidance route is detected, then the route calculation need not be performed, which allows the procedure to return to S10.

If S12 is YES, it is next judged whether an automatic re-search mode is set or not (S14). This mode is set using the input device 9. During the setting of the automatic re-search mode, once the vehicle deviates from the guidance route, re-search of the optimum route is automatically carried out. In this case, the destination is the same as that in the original guidance route, and the starting point is the current position. If the automatic re-search mode has been set, it is then judged that there is a state of action requiring the route calculation, allowing the procedure to advance to S18.

If S14 is NO, it is judged whether there is a demand for the start of the recalculation of route or not (S16). The user views a display on the display 11 and recognizes that the vehicle has deviated from the guidance route. It is possible for the user to command route re-search through the input device 9. At that time, the destination is the same as that in the original guidance route, and the starting point is the current position. If S16 is NO, there is no need for the recalculation of the route in spite of the deviation from the guidance route, and the procedure returns to S10. If S16 is YES, the process continues to S18.

Figure 4:
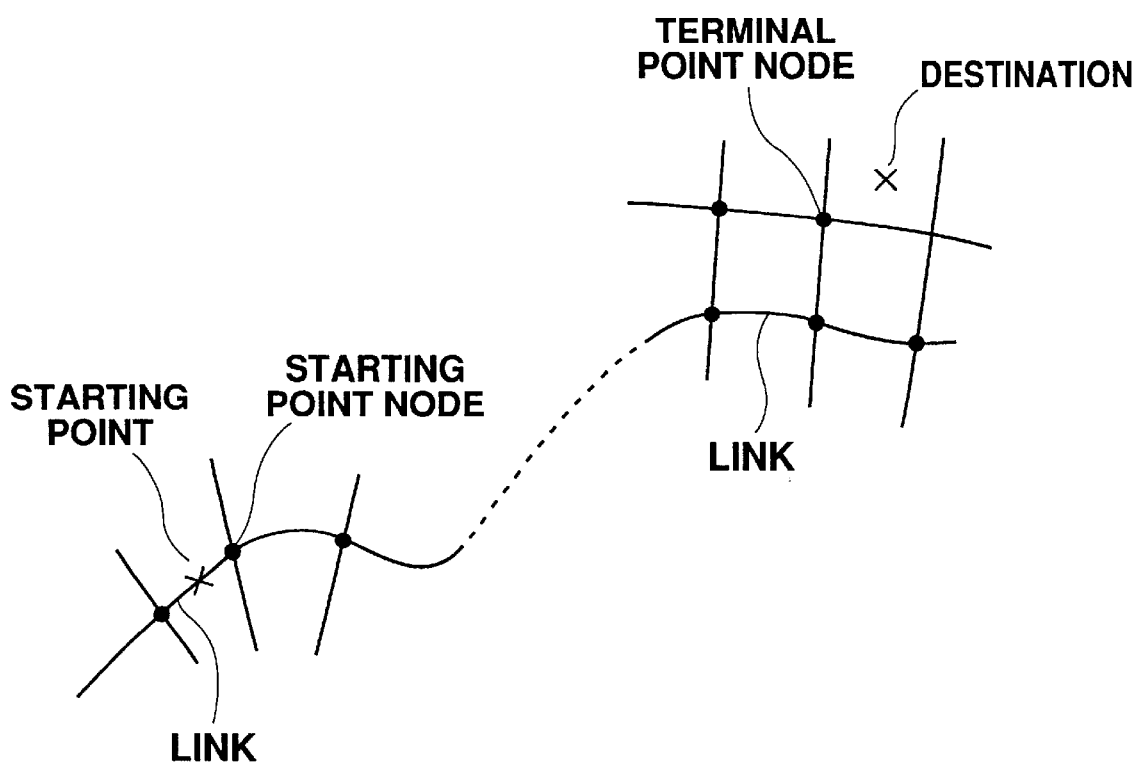
FIG. 4 is a diagram illustrating map data used for route calculation.

When the state of action requiring the route calculation is detected from the above processing, the main CPU 20 sets a start point node for the route calculation by the media processor 22 (S18), and further sets a terminal point node (S20). Map data for the route calculation may have links and nodes joining the links as shown in FIG. 4. A node near the starting point shown in FIG. 4 is selected as the starting point node, while a node near the destination is selected as the terminal point node.

Furthermore, the main CPU 20 sets a road network file access parameters necessary for the route calculation (S22). The map data commonly consists of a plurality of files. This parameter indicates a file required to calculate a route between the above starting point node and the terminal point node.

Then, the main CPU 20 sends a route calculation starting command to the media processor 22 (S24). Together with this command, the above starting point node, terminal point node, and access parameter are sent to the media processor 22.

The main CPU 20 also judges whether the route calculation to be performed thereafter is an initial route calculation or not (S26). When the judgment of the state of action in S10 is affirmative, the judgment in S26 also results in YES. On the basis of the result of judgment in S26, a time sharing ratio (time division ratio) is determined of the route calculation processing and the graphics processing in the media processor 22. When the initial route calculation is to be performed, the allocation time for the route calculation processing is set to 80% (S28), while the allocation time for the graphics processing is set to 20% (S30). On the other hand, when calculation of other than the initial route is to be performed, that is, when the route re-search is to be performed, the allocation time for the route calculation processing is set to 40% (S32), while the allocation time for the graphics processing is set to 60% (S34). This time sharing ratio is sent to the media processor 22 which performs route calculation processing and graphics processing in accordance with the set timing sharing ratio. Prior to the setting of the above ratio, the ratio of the graphics processing is 100%.

These time sharing ratios will next be explained.

(1) State of Action Requiring Initial Route Calculation (S28, S30)

This state is a state in which the user has entered a destination using the input device 9. This would typically be before the start of travelling, or perhaps at a stop. The user enters the destination and waits for the navigation apparatus 1 to provide an appropriate route. Therefore, the wait time of the route calculation result is a concern. On the contrary, the graphics processing is often less burdensome in this state because high speed continuous processing such as map scrolling or rotation is not usually required. Thus, a high time sharing ratio (80%) is set for the route calculation, and a low ratio (20%) is set for the graphics processing. This allows the route calculation to be performed in a short period of time and yet, even though the timing sharing ratio of the graphics processing has been reduced, the processing burden remains suppressed, so there is not a sense of incongruity in the image display.

(2) Action of State Requiring Recalculation of Route (S32, S34)

In this state of action, the vehicle is, inmost cases, in motion. For this reason, high-speed continuous processing for the image display is performed, imparting a heavy burden for graphics processing. In particular, when turning at intersections, the graphics processing requires a large calculation power because of the continuous rotation of the map.

Thus, a high time sharing ratio (60%) is set for graphics processing to thereby avoid creating a sense of incongruity in the image display. Correspondingly, the time sharing ratio of the route calculation is reduced (40%). However, in the route recalculation, the calculation wait time tends to pose less of a problem than for the initial route calculation. Furthermore, even though the calculation power is reduced, remarkably high-speed processing is possible as compared with the conventional general purpose CPU. The above ratio 40% should therefore be sufficient for route recalculation.

The preferred embodiment of the present invention has been described hereinabove. As described above, in this embodiment, the media processor 22 having an SIMD structure and/or a VLIW structure is provided separately from the general purpose type main CPU 20. Then, the general control processing is managed by the main CPU 20, whereas the route calculation processing and the graphics processing requiring a large calculation power is managed by the media processor 22, allowing the both to control the navigation apparatus 1.

A media processor itself is well known, which is for example, introduced in the form of an example of application to personal computers in "Full of Technologies (Technology Ga Ippai)" (Monthly ASCII, ASCII Inc. (Japanese publication), Vol. 21, May, 1997, pp. 354–359). A media processor is separately provided which acts in parallel with the conventional CPU. The media processor manages 2D/3D graphics processing, data modem function processing, FAX modem function processing, MIDI sound source processing, MPEG1 decode/encode processing, MPEG2 decode processing, etc. Upon extension of function of the personal computer, there is no need to provide a dedicated hardware for each processing described above. It is possible to deal with the extension of function by revising the version of the software for controlling the media processor. No application of such a media processor to a navigation apparatus has been found.

The present invention takes advantage of the fact that the navigation apparatus performs special processing for route calculation. Since this route calculation processing requires a number of product-sum operations using map data, sufficient calculation power can not be obtained using a conventional general purpose CPU. Therefore, the present invention is provided with the media processor separate from the main CPU. The main CPU takes charge of general various navigation processing, while the media processor takes charge of the route calculation processing. This allows the ability of the media processor to be utilized to its maximum, remarkably reducing the route calculation time, as well as ensuring a preferred ordinary control, which consequently enhances the market value of the navigation apparatus.

Furthermore, by causing the media processor to execute graphics processing along with route calculation, it is possible to further effectively utilize the media processor and to increase the speed of the graphics processing. As compared with a configuration having a hardware dedicated to the graphics processing, it is advantageous in terms of cost. A preferred controller adapted to the characteristics of the navigation apparatus is thus realized.

In particular, the configuration of this embodiment allows route calculation processing and graphics processing to be controlled in parallel by time sharing in the media processor, with the time sharing ratio being varied according to the state of action of the navigation, which requires either initial route calculation or the recalculation of the route after deviation. As a result, irrespective of the state of action, the route calculation is accomplished at high speed without incurring the occurrence of a sense of incongruity in the image display attributable to the deficiency in the calculation power of the graphics processing. In particular, it has an advantage that, upon the initial route calculation, most expecting the instantaneous calculation of the route, more power can be allocated to the route calculation by reducing the calculation power for the graphics processing.

In a variant of this embodiment, rather than the media processor performing both the route calculation processing and the graphics processing, the second program memory 26 stores therein a voice expansion processing program so that the media processor performs the voice expansion processing in place of the graphics processing. Alternatively, the media processor may perform the route calculation processing, the graphics processing and the voice expansion processing. The voice expansion processing is processing for expanding voice data in compressed state stored in e.g., the map storage section 7. The expanded voice data is output from the speaker 13 for use in the route guidance. This voice expansion processing also requires a number of product-sum operations and requires a large calculation power and is therefore a suitable process for the media processor. By executing the voice expansion processing by the media processor, there can be obtained the same effect as the case where the graphics processing is executed by the media processor.

Other further configurations are also conceivable in which the media processor performs various processing suitable for the media processor, that is, processing requiring quantities of produce-sum operations or the repeated operations, whereby the advantages of the present invention can be conveniently obtained.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A navigation controller to control a navigation apparatus, comprising:

a main CPU for executing a basic control program for controlling an action of the navigation apparatus and an action state judgment program for judging a state of the action of the navigation apparatus; and a media processor connected to said main CPU and including a plurality of simultaneously functioning ALUs to execute a route calculating processing program;

wherein in response to a result of judgment of the state of the action, said main CPU controls said media processor to calculate a route and then performs a route guidance using the calculated route;

wherein said media processor executes, in addition to route calculation, a predetermined accompanying program;

wherein on the basis of the judgment of the state of the action, said main CPU determines an allocation of time sharing control to the route calculation and to the predetermined accompanying program; and sends a control signal including the determined allocation to said media processor; and wherein said main CPU allocates a higher time sharing ratio to the route calculation when the state of the action is judged to be an initial route calculation for the state of route guidance, than when the state of the action is judged to be one to which a route recalculation is effected during the route guidance.

2. A navigation controller according to claim 1, wherein said media processor is a processor having at least one of a VLIW structure and an SIMD structure.

3. A navigation controller according to claim 1 wherein said media processor is a DSP having a plurality of ALUS.

4. A navigation controller according to claim 1, wherein in response to a result of judgment of said state of action, said main CPU commands an interruption of the processing of said route calculation processing program during the execution of said predetermined accompanying program.

5. A navigation controller according to claim 1, wherein said route recalculation during the route guidance is effected when a deviation from the route for use in the guidance occurs.

6. A navigation controller according to claim 1, wherein said predetermined accompanying program include a graphics processing program.

7. A navigation controller according to 1, wherein said predetermined accompanying program include a voice expansion processing program.

* * * * *

UNITED STATES PATENT AND TRADEMARK OFFICE
CERTIFICATE OF CORRECTION

PATENT NO. : 6,253,152 B1
DATED : June 26, 2001
INVENTOR(S) : Toru Ito

Page 1 of 1

It is certified that error appears in the above-identified patent and that said Letters Patent is hereby corrected as shown below:

<u>Title page,</u>
Item [57], in the ABSTRACT, line 1, after "includes", delete the comma.

<u>Column 11, claim 1,</u>
Line 33, "program;" should read -- program, --.

<u>Column 12, claim 3,</u>
Line 13, after "claim 1", insert a comma -- , --.
Line 14, "ALUS" should read -- ALUs --.

<u>Column 12, claim 6,</u>
Line 27, "program include" should read -- program includes --.

<u>Column 12, claim 7,</u>
Line 30, "program include" should read -- program includes --.

Signed and Sealed this

Nineteenth Day of March, 2002

Attest:

*Attesting Officer*

JAMES E. ROGAN
*Director of the United States Patent and Trademark Office*